(12) United States Patent
Rich, Jr.

(10) Patent No.: US 12,480,182 B2
(45) Date of Patent: *Nov. 25, 2025

(54) PROCESS AND APPARATUS FOR RECOVERING RARE EARTH ELEMENTS FROM COAL REFUSE

(71) Applicant: John W. Rich, Jr., Gilberton, PA (US)

(72) Inventor: John W. Rich, Jr., Gilberton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/201,491

(22) Filed: May 7, 2025

(65) Prior Publication Data

US 2025/0270675 A1 Aug. 28, 2025

Related U.S. Application Data

(63) Continuation-in-part of application No. 18/645,448, filed on Apr. 25, 2024, now Pat. No. 12,343,735, which is a continuation-in-part of application No. 18/149,185, filed on Jan. 3, 2023, now Pat. No. 12,011,725.

(51) Int. Cl.
*C22B 59/00* (2006.01)
*C22B 1/24* (2006.01)
*C22B 3/04* (2006.01)
*C22B 3/22* (2006.01)
*C22B 26/12* (2006.01)
*C22B 34/12* (2006.01)

(52) U.S. Cl.
CPC ............... *C22B 59/00* (2013.01); *C22B 1/24* (2013.01); *C22B 3/04* (2013.01); *C22B 3/22* (2013.01); *C22B 26/12* (2013.01); *C22B 34/1259* (2013.01)

(58) Field of Classification Search
CPC ........... C22B 59/00; C22B 26/12; C22B 3/22; C22B 1/24; C22B 3/04; C22B 34/1259; B03B 13/005; B03B 5/02; B03B 5/34; B03B 5/447; B03B 9/005; B03B 9/061
See application file for complete search history.

(56) References Cited

U.S. PATENT DOCUMENTS

| | | | | | |
|---|---|---|---|---|---|
| 4,217,207 | A | * | 8/1980 | Liller | B04C 5/02 |
| | | | | | 209/13 |
| 4,364,822 | A | * | 12/1982 | Rich, Jr. | B04C 5/13 |
| | | | | | 209/729 |
| 4,865,740 | A | * | 9/1989 | Callut | B04C 5/26 |
| | | | | | 209/729 |
| 2009/0165361 | A1 | * | 7/2009 | Rappas | C10L 5/00 |
| | | | | | 44/280 |

* cited by examiner

*Primary Examiner* — Latosha Hines
(74) *Attorney, Agent, or Firm* — McHale & Slavin, P.A

(57) ABSTRACT

A process for concentrating and separating rare earth elements including lithium and titanium from coal refuse. Crushed refuse admixed with water is transferred to a first cyclone separator to divide the admixture into a refuse rich slurry stream and a carbonaceous rich slurry stream. The refuse rich slurry stream is dewatered through a vibrating screen and the water sent to a raw feed sump source. The carbonaceous rich slurry is directed to a second cyclone separator to separate low quality carbon from high quality carbon, the high quality carbon is transferred to a third cyclone separator used to separate the element rich media. The media water is returned to the raw feed sump and the bleed media is directed to a centrifuge which thickens the concentration of rare earth elements and minerals. The effluent is directed to a tailings pond or vacuum press.

13 Claims, 3 Drawing Sheets

PROCESS AND APPARATUS FOR RECOVERING RARE EARTH ELEMENTS FROM COAL REFUSE

PRIORITY CLAIM

In accordance with 37 C. F. R. § 1.76, a claim of priority is included in an Application Data Sheet filed concurrently herewith. Accordingly, the present invention claims priority as a continuation-in-part U.S. patent application Ser. No. 18/645,448, entitled "PROCESS AND APPARATUS FOR SEPARATING VARIOUS ELEMENTS SUCH AS CESIUM FROM REFUSE", filed Apr. 25, 2024, which is a continuation-in-part of U.S. patent application Ser. No. 18/149,185, entitled "PROCESS AND APPARATUS FOR SEPARATING ANTHRACITE OR BITUMINOUS FROM REFUSE", filed Jan. 3, 2023, now U.S. Pat. No. 12,011,725, issued Jun. 18, 2024, the contents of which the above referenced applications are incorporated herein by reference in their entirety.

FIELD OF THE INVENTION

The present invention relates to the energy field and, more specifically, to a process and apparatus for recovering rare earth elements including Lithium and Titanium from coal refuse and tailings.

BACKGROUND OF THE INVENTION

Since the early 1800's, coal has been valued for its energy content, and substantial quantities of Anthracite was mined and processed to produce coal of various sizes. The coal was separated from mining refuse, and huge mounds of tailings were produced; mine tailings being the material left over after the process of separating the valuable energy rich ore. Tailings processed once or twice by previously known methods are presumed to be uneconomical to further process. For purposes of this disclosure, the terms coal tailings and coal refuse will be used interchangeably.

Rare earth elements that are addressed in this disclosure are a group of chemically similar elements that are rarely found in a concentrated form. However, small amounts are found in coal refuse but are too expensive to recover with conventional mining equipment. These elements are critical in the manufacture of smartphones, screen displays, solar panels, lasers and the like electronics. Lithium (Li), an alkali metal best known for its use in rechargeable batteries is also found in coal refuse. Further, titanium (Ti), a transition metal, is found in coal refuse.

The elements from the periodic table include: Lanthanum (La), Cerium (Ce), Praseodymium (Pr), Neodymium (Nd), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), with Scandium (Sc) and Yttrium (Y) having similar properties. Recovering the above mentioned elements from coal refuse or coal tailings is challenging. With the conventional recovery equipment, the small amounts of elements in coal refuse makes it uneconomical to extract. Rare earth elements in coal tailings may even be more difficult as such elements may be in the range of 10-500 parts per million (ppm). For known conventional recovery equipment, tailings composed of very fine particles complicates separation and extraction techniques. The finer materials are harder to handle physically and often clog or slow down conventional processing equipment.

In April of 2025, China imposed export restriction on seven rare earth metals which further necessitates the need for the U.S. to be more efficient in recovery of these valuable elements.

SUMMARY OF THE INVENTION

Disclosed is a process and equipment for concentrating and separating various rare earth elements, lithium and titanium. The process employs several cyclone separators staged to recover low and high quality carbon effectively concentrating the elements. The carbon rich overflow from a first cyclone separator reports to a second cyclone separator where the underflow is a low quality carbon and the overflow is high quality carbon. The carbon rich overflow reports to a third cyclone separator which separates the high quality carbon from the element rich slurry. The water from the third cyclone separator is continuously circulated until the density reaches 1.35 or 1.45 (dirty H20) specific gravity, at which point fresh water is added and dirty water removed to a tailings pond, vacuum press, or a centrifuge to be clarified and reused. The process admixes refuse having an approximate size of less than 3/8"×0" with water from a water storage source into a feedstock slurry. The underflow stream is dewatered through a vibrating screen, and the collected water is recirculated to a main feed sump. The slurry is directed to a second cyclone separator to further separate low quality carbon from high quality carbon, the low quality carbon available for a market that uses a lower quality of coal (i.e. Cogen Industry). The high quality element rich slurry is transferred to a third cyclone separator to separate high quality carbon from the element rich slurry, the separated media is returned to the main feed sump. The media water is returned to the raw feed sump and the bleed media is directed to a centrifuge which thickens the concentration of rare earth elements and minerals. The effluent is directed to a tailings pond or vacuum press.

The element rich slurry is then subjected to chemical processing to extract the rare earth elements, lithium and titanium. The slurry containing the elements would then undergo purification steps to remove impurities and other elements that may have been dissolved during any leaching process. Once purified, the concentrated rare earth elements, lithium and titanium would be recovered from the solution in a concentrated form. This could be achieved through processes such as evaporation, crystallization, or electrolysis, depending on the specific compounds present.

An objective of the invention is to concentrate rare earth elements, lithium and titanium from coal mine refuse or tailings.

Another objective of the invention is to teach a four stage refuse process, summarized as a first cyclone separator for rejecting the bulk of inert fireproof rock, a second cyclone separator for separating high quality carbon from low quality carbon, a third cyclone separator to separate circulating media water from the high quality carbon wherein media water is returned to a raw feed sump and the bleed media is directed to a centrifuge which thickens the concentration of rare earth elements and minerals. The effluent is directed to a tailings pond or vacuum press.

It is another objective of the instant invention to provide an improved element separation process that is environmentally friendly using recycled water.

Yet another object of the instant invention is to reduce the need for ancillary equipment and manpower to separate and concentrate rare earth elements, lithium and titanium from low quality ore.

Yet another objective of the invention is to teach a highly efficient process for the recovery of rare earth elements, lithium and titanium from a slurry stream.

An advantage of the process is the minimum amount of energy necessary for operation because the separation is achieved at relatively low specific gravities and relatively low pressures.

Another advantage of the process is that has a low operating cost.

Another advantage of the process is the minimal amount of equipment and make-up water required.

Still another objective is to teach a process which results in an element rich product being produced with zero cost wherein operating costs are covered by the concentration and sale of recovered elements.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
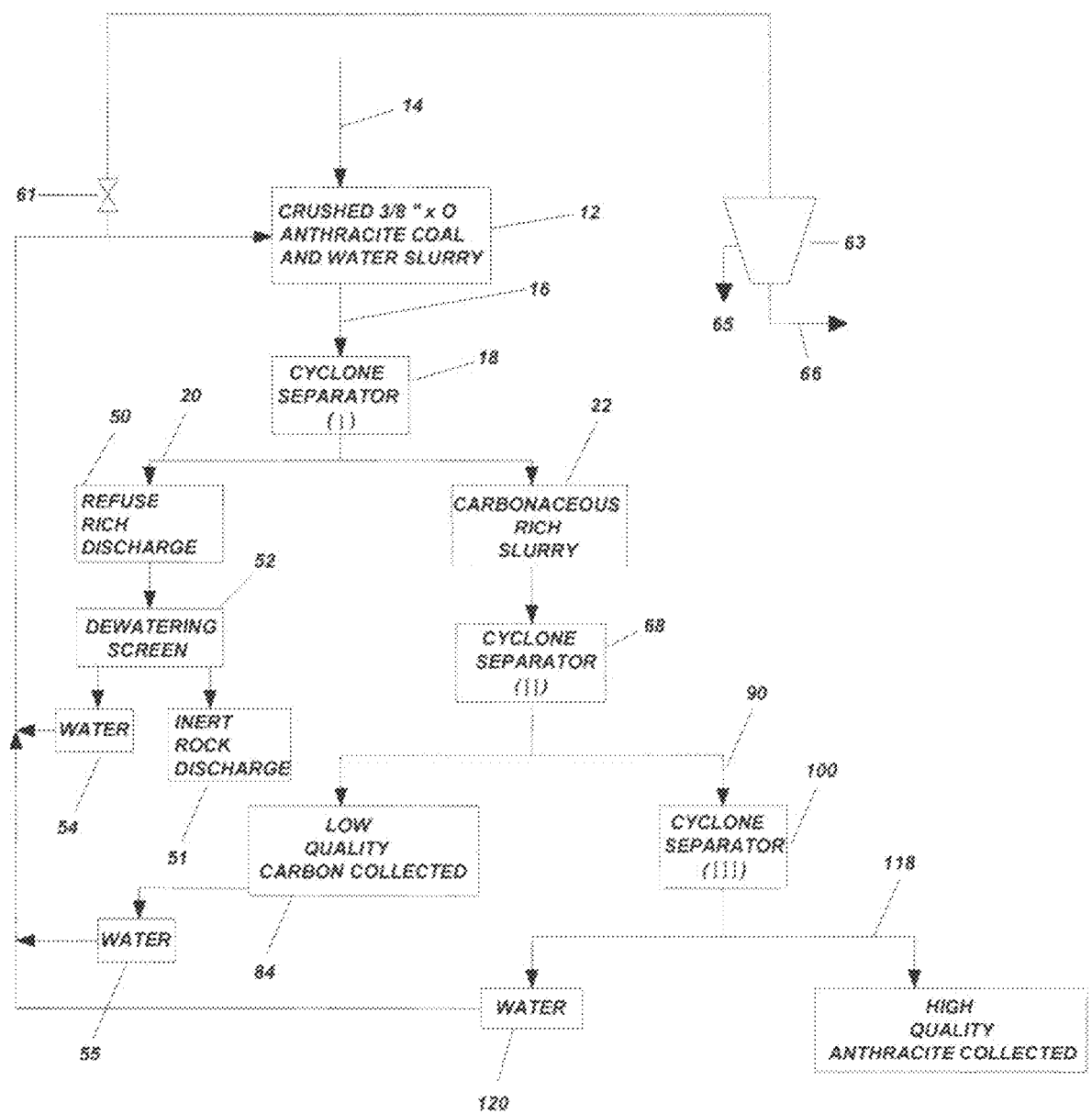
FIG. 1 is a flow chart depicting the staging of the three cyclone separators.
Figure 2:
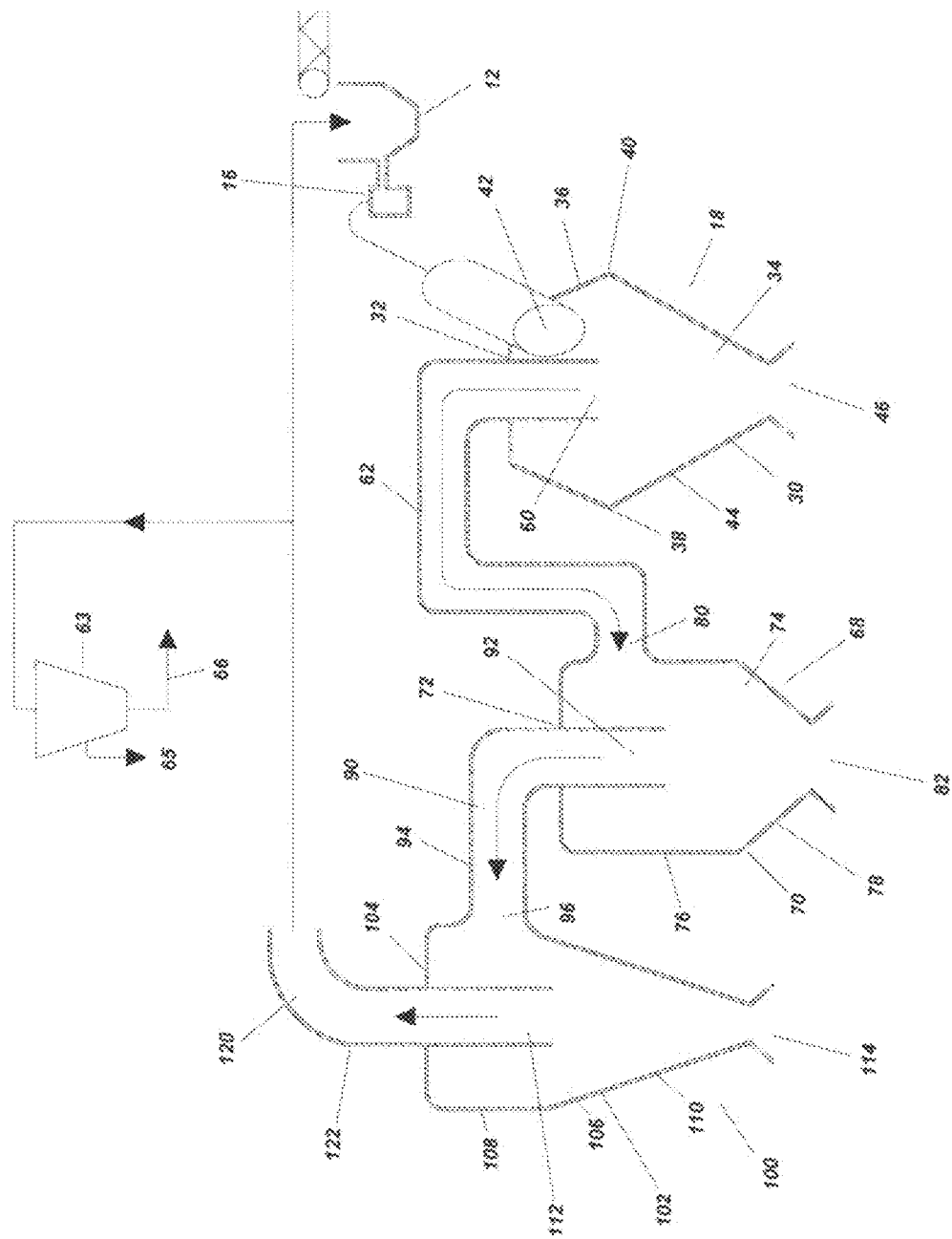
FIG. 2 is a frontal pictorial view of the three cyclone separators per the instant invention.
Figure 3:
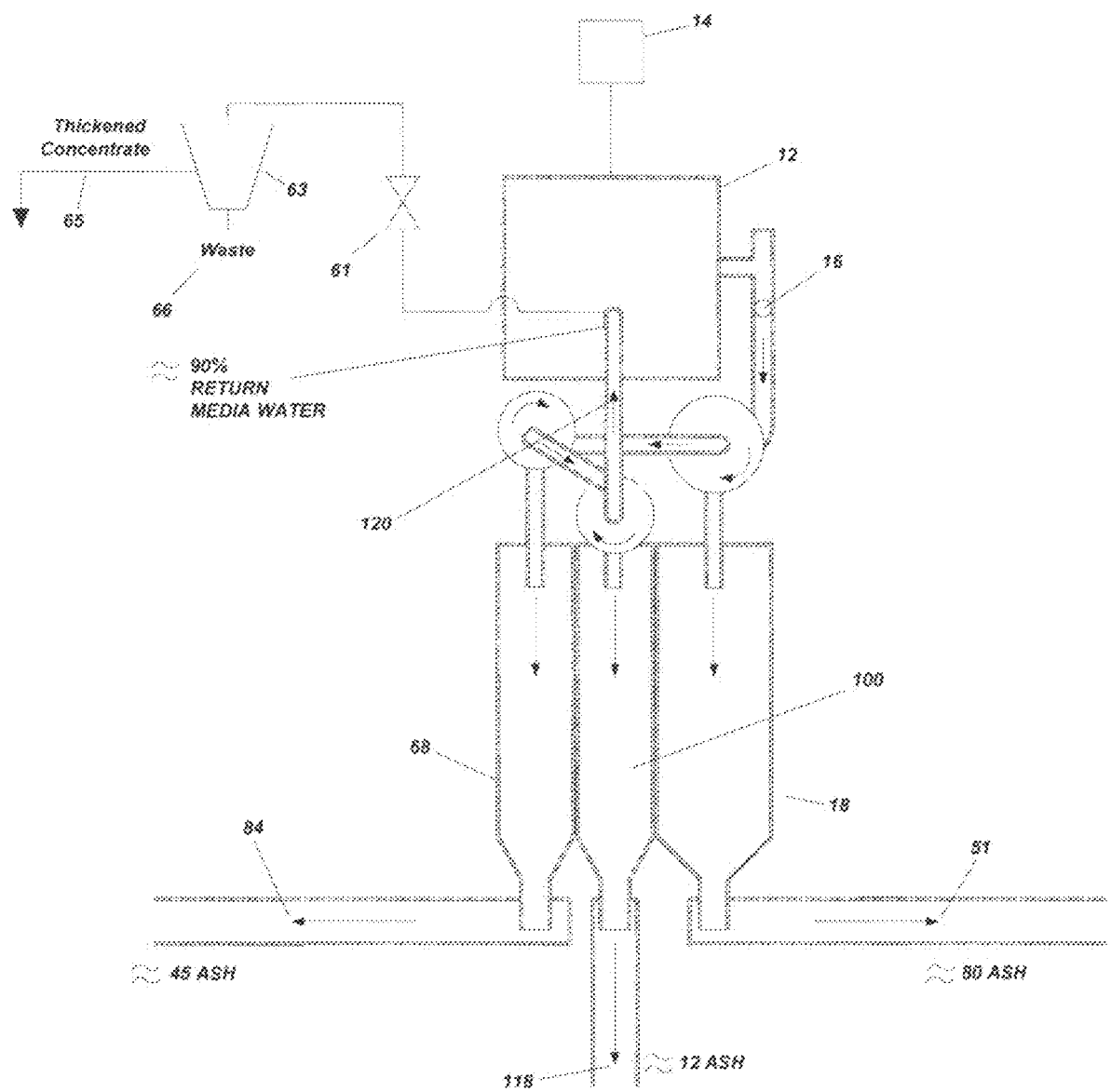
FIG. 3 is a side pictorial view thereof.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

A typical coal pile may comprise up to 20% by weight of coal with the balance being refuse. As used herein, the term coal is intended to mean Anthracite or Bituminous coal, and the term refuse is intended to mean a variety of inorganic matter such as rocks, shale, slate, clay, and the like, which is mined along with the coal. Referring to the figures in general, in the processes, refuse 10 which may comprise less than 20% coal by weight, is crushed and screened to an approximate size range of less than ⅜"×0". The crushed refuse is admixed with water 14 drawn from a water source forming an admixture 16. The admixture 16 is transferred into a first cyclone separator 18 constructed and arranged to divide the admixture 16 into a refuse rich slurry stream 20 and a rich slurry stream 22. Preferably, as further described herein, the cylindrical shaped cyclone separators have a continuous sidewall shaped to adjust acceleration/centrifugal force of the slurry stream. A first cyclone separator 18 has a continuous sidewall 30 depending from a top wall 32 forming a chamber 34 therein. An upper section 36 is formed by the sidewall 30 expanding from a first diameter, as measured by the size of the top wall 32 expanding outwardly to a middle section 38 forming a second diameter 40, as measured along the widest portion of the sidewall 30. The admixture 16 is admitted through an inlet 42 formed tangentially in the sidewall 30, wherein acceleration is slowed and then rapidly increased upon entering a third section 44, wherein the sidewall 30 is formed into a conical shape diminishing in diameter from the middle section 38 to a first apex 46 to expel a refuse rich slurry 50 containing inert rock. The refuse rich slurry 50 is passed over a vibrating screen 52 for dewatering. Water 54 collected from the dewatering step is directed to the raw feed sump 12 for reuse, and the inert rock 51 with about 80% ash content is discharged 53. Because of the cylindrical shape, a substantial deceleration and acceleration is imparted to the solids as they circulate in the chamber at any given radius.

The carbon rich slurry stream 22 is drawn from an outlet 60 through a transfer line 62 to a second cyclone separator 68. The second cyclone separator 68 has a continuous sidewall 70 depending from a top wall 72 forming a chamber 74 therein. An upper section 76 is formed by the sidewall 70 depending from a first diameter, as measured by the size of the top wall 72, with a uniform diameter to a lower section 78. The admixture, being a carbon rich slurry stream 22, is admitted through an inlet 80 formed tangentially in the sidewall 70, wherein acceleration is maintained and then rapidly increased upon entering the lower section 78, wherein the sidewall 70 is formed into a conical shape, diminishing in diameter along the length of the lower section 78 to a second apex 82 for expelling a low quality carbon 84 with about 45% ash content with water 55 separated and returned to the raw feed sump 12.

The high quality slurry 90 is drawn from the vortex 92. The high quality carbon exits the second cyclone separator 68 through an intake 92 and transfer line 94. A cylindrical type of cyclone is to be contrasted with a tapered or variable acceleration type, wherein the shell has a depending frustoconical or tapered portion of substantial length and a relatively small included cone angle. Because of the conical shape, the acceleration forces increase on the particles as they circulate and advance. A control valve 61 allows the directing of the water to a centrifuge 63 for a thickened element and mineral concentrate 65 with excess water 66 drawn from the process for concentrating rare earth elements.

The specific gravity of the medium tends to increase after the process has been operating in the steady state for a period of time. In order to control the specific gravity of the element rich medium within the desired range upstream of the first cyclone separator, the recirculating media is constantly monitored with a density gauge so that appropriate action can be taken to maintain the specific gravity within the desired range. For instance, if the specific gravity should increase beyond the desired limit, it can be reduced by bleeding media water out of the system and adding fresh water. If the specific gravity should drop below the desired lower level, it can be increased by decreasing the particulate matter in the crushed material make up.

The high quality carbon slurry stream 90 is drawn through the transfer line 94 to a third cyclone separator 100. The third cyclone separator 100 has a continuous sidewall 102 depending from a top wall 104 forming a chamber 106 therein. An upper section 108 is formed by the sidewall 102 depending along a first diameter, as measured by the size of the top wall 104 maintaining a uniform diameter to a lower section 110. The high quality slurry 90 is admitted through an inlet 96 formed tangentially in the sidewall 102, wherein acceleration is maintained and then rapidly increased upon entering the lower section 110. The sidewall 102 is formed into a conical shape, diminishing in diameter along the length of the lower section 110 to a third apex 114 used for expelling dewatered high quality 112 carbon with about 12% ash content. In one embodiment, the third cyclone 100 operates to separate the high quality carbon slurry 90 from the media fluid 120 drawn from an intake 112 of the cyclone separator 100 through a transfer line 122 with a bleed line 124 for drawing valuable elements with about 80% return of the media fluid 120 to the raw feed sump 12. To maintain a specific gravity of the admixture 16, the fresh water 14 is mixed with the refuse 10 to continue with the recycling and removal of high quality elements, namely. To further thicken the concentrate the media fluid 120 can directed to a final centrifuge 63 through a valve 61 for a further thickening of the concentrate which is separated from the waste water.

According to this preferred embodiment of the present invention, the above-described process will operate efficiently in a continuous manner to separate carbon of different qualities from refuse, and draw high quality rare earth elements, lithium and titanium from the process, provided certain process conditions are observed. For instance, for Anthracite coal it is important that the specific gravity of the water is measured through the water storage source. For Anthracite coal having a specific gravity of about 1.75, the density of the water should be maintained in a range of about 1.35 and 1.45 specific gravity.

In a preferred embodiment, the feedstock slurry is supplied at a static pressure in a range of about 10 psi to about 20 psi at a volumetric flow rate in a range of about 2,000 gpm.

The process disclosed herein is directed to separating elements and a high and low quality carbon from refuse. While some adjustments in operating conditions will have to be made to compensate for the different specific gravity of the element rich slurry, such adjustments should be apparent to those skilled in the art in light of the present disclosure.

The concentrated ore is then subjected to chemical processing to extract the rare earth elements and other minerals. This typically involves leaching the ore with a strong acid, such as hydrochloric acid, to dissolve the minerals. The resulting solution contains dissolved carbon along with other impurities. The solution would undergo purification steps to remove impurities and other elements that may have been dissolved during the leaching process. This could involve techniques such as solvent extraction, ion exchange, or crystallization. Once purified, the elements would need to be recovered from the solution in a concentrated form. This could be achieved through processes such as evaporation, crystallization, or electrolysis, depending on the specific compounds present.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process for concentrating rare earth elements, lithium and titanium from coal refuse comprising the steps of:

crushing coal refuse into an approximate size less than ⅜"×0;

admixing the crushed refuse with water in a raw feed sump into an admixture;

transferring the admixture to a first cyclone separator having a substantially cylindrical chamber further defined by an upper section of a first diameter, a middle section having a second diameter greater than said first diameter reducing the speed of the admixture rotation, and a conical shaped lower section diminishing in diameter from said middle section, said first cyclone separator constructed and arranged to divide said admixture into a refuse rich slurry stream of about 80 Ash content to be discharged from a first apex positioned at the bottom of said lower section and a carbonaceous rich slurry stream drawn from an outlet positioned at said second diameter;

directing said refuse rich slurry stream through a vibrating screen, said vibrating screen dewatering said refuse rich slurry stream and directing water collected from said dewatering step to said raw feed sump;

transferring said carbonaceous rich slurry drawn from said outlet positioned at said second diameter of said middle section of said first cyclone separator to a second cyclone separator having a substantially cylindrical chamber defined by an upper section of a first diameter, a middle section having a second diameter equal to said first diameter, and a conical shaped lower section diminishing in diameter from said second section constructed and arranged to separate low quality carbon of about 45 Ash content from a high quality carbon slurry;

collecting the low quality carbon from a lower section of said second cyclone separator;

transferring the high carbon slurry drawn from an intake positioned at an upper section of said second cyclone separator to a third cyclone separator constructed and arranged to separate media from high quality carbon slurry, said third cyclone separator having a substantially cylindrical chamber defined by an upper section of a first diameter and a conical shaped lower section diminishing in diameter to an outlet;

returning fluid separated from the high quality carbon slurry drawn from an intake positioned where an upper section defined by a uniform diameter meets a lower section defined by a diminishing diameter of said third cyclone separator to said raw feed sump;

bleeding a portion of the returned fluid now concentrated with rare earth elements, lithium, and titanium.

2. The process according to claim 1 including the step of monitoring said fluid to maintain a density between a range of 1.35 and 1.45 specific gravity.

3. The process according to claim 2 wherein fresh water is added to said raw water feed sump to maintain said specific gravity range.

4. The process according to claim 1 wherein the element rich water exceeding said specific gravity range is directed to a vacuum press for clarification and the clarified water directed to said raw feed sump.

5. The process according to claim 1 wherein the element rich water exceeding said specific gravity is directed to a centrifuge to be clarified and the clarified water returned to said raw feed sump.

6. The process according to claim 1 wherein water exceeding said specific gravity range is directed to a tailing pond.

7. The process according to claim 1 wherein feedstock slurry is introduced into said upper section of said first cyclone separator.

8. The process according to claim 1 wherein said second cyclone conical shaped lower section diminishing in diameter from said second section to expel low quality carbon.

9. The process according to claim 1 wherein said third cyclone is constructed and arranged for discharge of concentrated rare earth elements, lithium and titanium.

10. The proc according to claim 1 wherein said first cyclone separator middle section includes axial extent greater than said first section for imparting tangentially-admitted feedstock slurry, a reduction in acceleration followed immediately by increasing acceleration in a depending lower section conical portion.

11. The process according to claim 10 wherein said feedstock slurry is supplied at a static pressure in a range of about 10 psi to about 20 psi at a volumetric flow rate in a range of about 2,000 gpm.

12. The process according to claim 1 including a final centrifuge fluidly coupled the waste water line wherein a portion of the waste water is for further thickening of concentrate separated from the waste water.

13. A process for concentrating rare earth elements, lithium, and titanium from coal refuse, comprising the steps of:

crushing coal refuse to a particle size of less than approximately ⅜ inch by 0;

admixing the crushed coal refuse with water in a raw feed sump to form an aqueous admixture;

transferring the admixture to a first cyclone separator comprising a substantially cylindrical chamber defined by: an upper section having a first diameter, a middle section having a second diameter ater than said first diameter, thereby reducing the rotational speed of the admixture, and a conical lower section tapering from said second diameter to a lower apex;

said first cyclone separator being configured to divide the admixture into a refuse-rich slurry stream with an ash content of approximately 80%, discharged through a first apex at the bottom of said conical section, and a carbonaceous-rich slurry stream withdrawn from an outlet positioned at said middle section having said second diameter;

directing the refuse-rich slurry stream through a vibrating screen to dewater the stream, and returning the water collected from said dewatering step to the raw feed sump;

transferring the carbonaceous-rich slurry stream from said outlet of the first cyclone separator to a second cyclone separator comprising a substantially cylindrical chamber defined by: an upper section having a first diameter, a middle section having a second diameter substantially equal to said first diameter, and a conical lower section tapering to a lower outlet, said second cyclone separator being configured to separate a low-quality carbon stream having an ash content of approximately 45% discharged through said lower outlet; and a high-quality carbon slurry, withdrawn through an intake positioned at said upper section;

transferring the high-quality carbon slurry to a third cyclone separator comprising a cylindrical upper section having a first diameter and a conical lower section tapering to an outlet, said third cyclone separator being configured to separate media from the high-quality carbon slurry;

withdrawing fluid separated from the high-quality carbon slurry through intake located at the junction of said cylindrical upper section and conical lower section of said third cyclone separator, and returning said fluid to the raw feed sump;

directing water from said cyclone separators to a centrifuge having an outlet for producing a thickened concentrate and a concentrated waste; and retrieving a portion of the returned fluid concentrated with rare earth elements, lithium, and titanium.

* * * * *